Sept. 14, 1948.　　　A. B. SCHULTZ　　　2,449,417
BUOYANT GROUND STATION

Filed Sept. 25, 1946　　　　　　　　　　　7 Sheets-Sheet 1

INVENTOR.
ARTHUR B. SCHULTZ
BY John A. Robertson

Sept. 14, 1948.  A. B. SCHULTZ  2,449,417
BUOYANT GROUND STATION
Filed Sept. 25, 1946  7 Sheets-Sheet 2

INVENTOR.
ARTHUR B. SCHULTZ
BY John F. Robertson

Sept. 14, 1948.　　　　A. B. SCHULTZ　　　　2,449,417
BUOYANT GROUND STATION

Filed Sept. 25, 1946　　　　　　　　　　　7 Sheets-Sheet 4

INVENTOR.
ARTHUR B. SCHULTZ
BY

Sept. 14, 1948.  A. B. SCHULTZ  2,449,417
BUOYANT GROUND STATION

Filed Sept. 25, 1946  7 Sheets-Sheet 5

INVENTOR.
ARTHUR B. SCHULTZ
BY John V. Robertson

Sept. 14, 1948.  A. B. SCHULTZ  2,449,417
BUOYANT GROUND STATION

Filed Sept. 25, 1946  7 Sheets-Sheet 6

INVENTOR.
ARTHUR B. SCHULTZ
BY John F. Robertson

Sept. 14, 1948.  A. B. SCHULTZ  2,449,417
BUOYANT GROUND STATION
Filed Sept. 25, 1946  7 Sheets-Sheet 7

INVENTOR.
ARTHUR B. SCHULTZ
BY

Patented Sept. 14, 1948

2,449,417

UNITED STATES PATENT OFFICE 2,449,417

BUOYANT GROUND STATION

Arthur B. Schultz, Wilmington, Del., assignor to All American Aviation, Inc., a corporation of Delaware Application September 25, 1946, Serial No. 699,104

6 Claims. (Cl. 258—1.2)

The present invention deals with air pick-up and is concerned primarily with rescue operations involving the picking up by an aircraft of a human being from a life raft.

During the war an exceedingly large amount of transoceanic air traffic developed and it appears that in post-war conditions there will still be a large amount of air traffic of this character. Ordinarily an aircraft which is flown across large bodies of open water is provided with equipment for saving the life of the pilot and other personnel in the event the aircraft should fail in flight. This equipment consists essentially of a life raft which is inflated into its buoyant state after the pilot is forced to bring his plane down into the water. The auxiliary equipment has been that which will keep the pilot alive on the raft until such time as he is rescued. It is obvious that survivor of an air mishap is more readily located by another aircraft. It is equally obvious that it would be extremely desirable to provide equipment which would permit the survivor to be rescued by the aircraft which locates him. There has been some rescue work of this character performed by helicopter and autogyros, but this type of aircraft has an exceedingly small flying radius and it is utterly impractical for such aircraft to either locate or rescue a survivor at any great distance from its base.

With the foregoing conditions in mind, this invention has in view as its foremost objective, the provision of equipment which will provide for the picking-up of a human being from a life raft by an aircraft in flight. In carrying out this objective, the invention proposes to follow the now well developed technique of air pick-up which has been employed for picking up such objects as mail, gliders, and even human beings from land bases.

In order to pick up a human being in accordance with these now accepted practices, it is necessary to provide a ground station. This ground station supports a loop in a position in which it is adapted for engagement by a hook located on the pick-up aircraft. Accordingly, a further object of the invention is the provision of rescue equipment of the character indicated including a ground station which is adapted to assume an erected position in the water.

In carrying out this idea, the invention proposes to employ a buoy which ordinarily contains all the elements of a ground station in a collapsed condition. When occasion for its use arises, the buoy is operated to cause the ground station to assume its extended or erected position in which the loop is properly offered for engagement by the pick-up hook.

In picking up a human being, it is highly desirable, if not of absolute importance, to properly correlate the position of the person being picked up with the ground station. Thus, a further object of the invention is the provision of rescue equipment of the character indicated including means for properly positioning the ground station buoy with respect to the life raft with the pick-up loop.

Various other more detailed objects and advantages of the invention such as arise in connection with carrying out the above noted ideas in a practical embodiment will in part become apparent and in part be hereinafter stated as the description of the invention proceeds.

The invention therefore comprises rescue equipment designed to effect the picking up of a human being from a life raft and which consists essentially of a buoy containing a collapsed ground station which is adapted to be extended and assume a proper position with respect to the person being picked up from the life raft.

For a full and more complete understanding of the invention reference may be had to the following description and accompanying drawings wherein.

Figure 3:
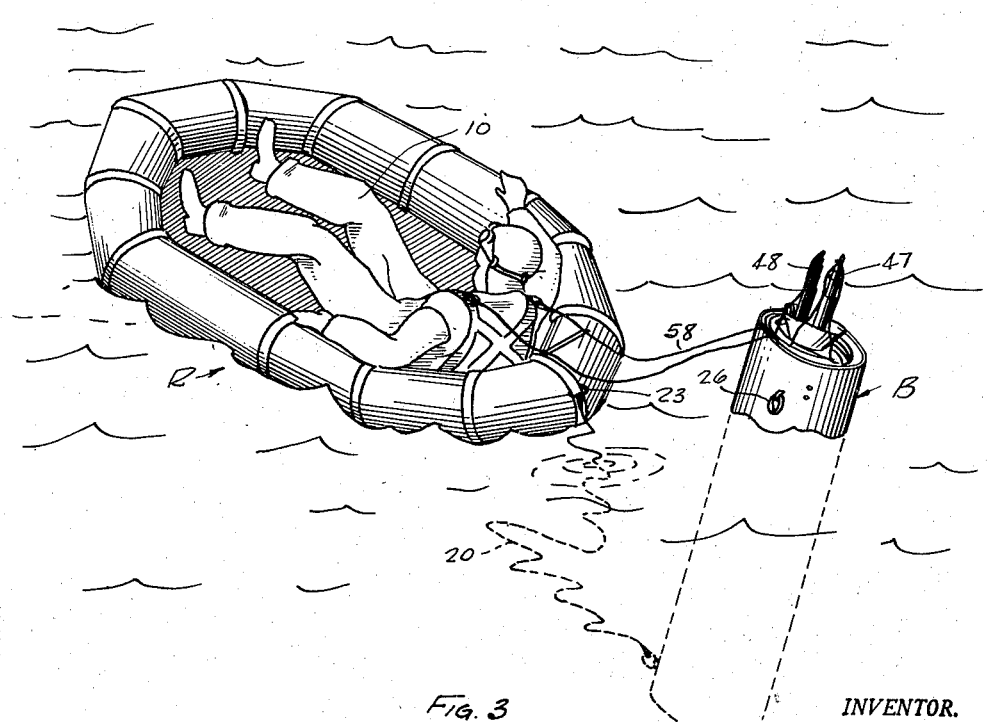
Figure 3 is a perspective showing the buoy containing the ground station with its top closure removed and prior to extention of the ground station together with the life raft and occupant thereof.

Referring now to the drawings wherein like reference characters denote corresponding parts, and first more particularly to Figure 3, a life raft is shown at R as occupied by a human being 10 who ordinarily will be the surviving pilot of a plane which has failed in transoceanic flight. The life raft R ordinarilly will be of a conventional type employed in situations such as this. It is originally packed in a non-inflated condition on the various aicraft making flights across open bodies of water and in a position in which it is quickly available to the pilot in conditions of emergency. When the emergency arises, it is inflated into the buoyant condition depicted in Figure 3 and in which it is to be occupied by the pilot.

Figure 5:
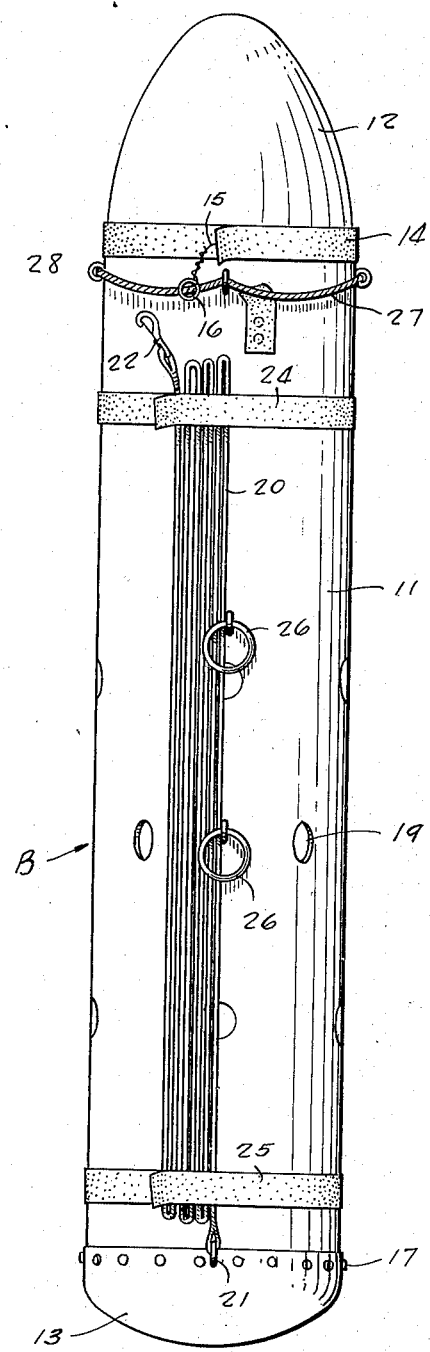
Figure 5 is a view in side elevation of the completely assembled buoy.
Figure 6:
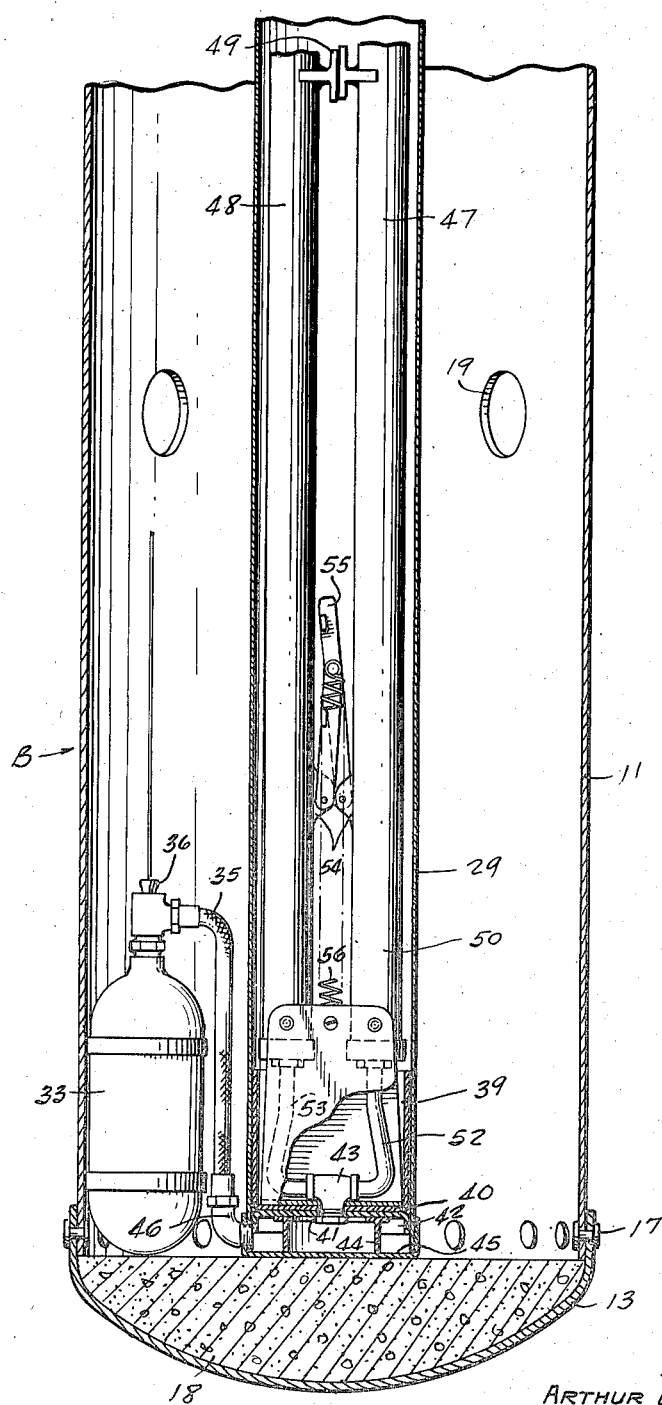
Figure 6 is a sectional view taken on an enlarged scaled through the lower portion of the buoy.

The life raft R will ordinarily carry food rations and a supply of water and other incidentals necessary to sustain life for a predetermined period. All of these are suitably packed on the life raft. A buoy which is referred to in its entirety by the reference character B is adapted to be dropped from a rescue aircraft which has located the survivor on the life raft. The complete buoy B is shown in Figure 5 and comprises essentially a main cylindrical body portion 11, a top closure 12 in the form of a rounded nose, and a weighted base 13. The nose 12 is detachably mounted on the upper end of the cylindrical body portion by an adhesive strip 14 which is positioned over a rip-cord 15. The latter projects beyond the overlapping ends of the strip 14 and at its free end carries a ring 16 which is adapted to be easily grasped by the operator so that the rip-cord may be pulled and thereby release the nose closure from the cylindrical body portion 11, thereby exposing the contents of the latter. The base 13 may be joined to the lower end of the body portion 11 in any preferred manner such as by the fastening elements shown at 17. This base may also be weighted in any preferred manner such as by being filled with the cementitious material shown at 18 in Figures 4 and 6.

The cylindrical case 11 is provided with a plurality of openings 19 which permit the entrance of water into the interior of the casing. Such water coupled with the weighted base 13 causes the buoy to assume the upright position illustrated in Figures 1 and 3. Carried on the exterior surface of the cylindrical body 11 is a line 20 which is intended to constitute the means for connecting the buoy B to the life raft R. One end of this line 20 is anchored to the base 13 by the interlocked rings shown at 21, while the other end carries a snap fastener 22 which is adapted to be connected to the life raft R by engagement with a ring shown at 23 in Figure 3. Between its extremities the line 20 is folded into the compact condition illustrated in Figure 5 and in this folded condition it is held on the outer surface of the body 11 by adhesive strips 24 and 25 which may be quickly removed. Rings shown at 26 are positioned on the exterior of the body 11 and suitably anchored thereto. These rings are employed in positioning the buoy on the rescue aircraft such as the bomb racks thereof. If desired, a line 27 is loosely threaded through eyes 28 around the body 11 adjacent to the upper end to facilitate handling and manipulation.

Figure 4:
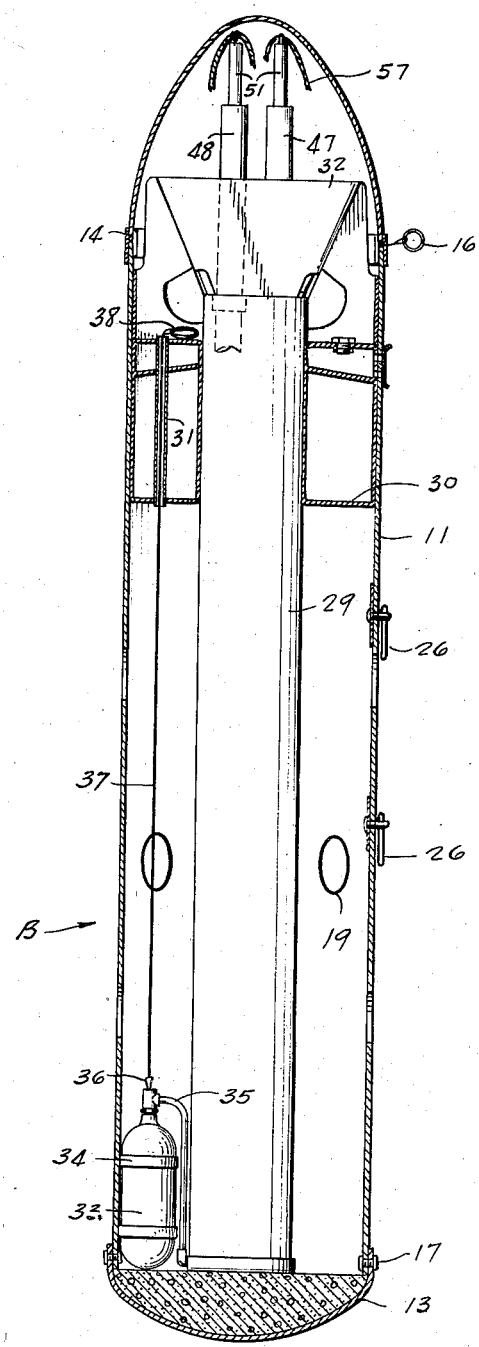
Figure 4 is a side view taken as a vertical section through the buoy and bringing out certain of the elements contained therein in elevation.

Referring now more particularly to Figure 4, a cylindrical core 29 is shown as extending from the base 13 up to a point a short distance from the upper end of the cylindrical body 11. This core 29 is preferably disposed substantially centrally of the casing 11. A hollow housing shown at 30 effects proper spacing at the upper end and anchorage base at 13 properly positions the lower end. A tube 31 extends through the housing 30 for a purpose to be later described.

A flared or funnel shaped guide 32 is carried within the casing 11 above the upper end of the core 29. At the bottom of the casing 11 on the outside of the core 29 there is positioned a gas reservoir 33 which is held in position by bands 34. A conduit 35 extends from this reservoir to the interior of the core 29. A control valve depicted diagrammatically at 36 is included at the point where this conduit 35 is connected to the reservoir 33. A line 37 is connected to the valve 36 and extends upwardly through the tube 31 and the free end of this valve carries a ring 38 which is adapted to be engaged by the user of the equipment to exert a pull on the line 37 and open the valve 36.

Slidably mounted within the core 29 adjacent to the lower end thereof is a cup-shaped member 39 having a bottom 40 formed with an aperture 41. A shallow complemental cup-shaped member 42 is in an inverted position with respect to the cup-shaped member 39 with its bottom in an abutting relation to the bottom 40. The bottom of the member 42 also has an aperture in alignment with the aperture 41. A T fitting 43 has its stem positioned in the aligned apertures with the T itself disposed in the bottom of the cup-shaped member 39. The stem of the T fitting 43 opens into a ring fitting 44 which normally extends from the bottom of the cup-shaped member 42 to the bottom 45 of the core 29. The conduit 35 is connected to a fitting 46 which opens into the core 29 around the ring 44 and between the bottom 45 and the cup-shaped member 42. It is evident that when the valve 36 is open, gas from the reservoir 33 is originally introduced beneath the abutting bottoms of the cup-shaped members 39 and 42 and around the ring 44. The initial effect of this gas is to raise the assembly of the cup-shaped members. After the ring 44 has been raised from the bottom 45, gas will be admitted into the T 43.

Assembled within the core 29 are a pair of telescopic ground station poles 47 and 48. These poles are disposed in spaced relation as determined by the guide brackets shown at 49. Each of the poles 47 and 48 is of telescopic construction, comprising a lower tube 50 of larger diameter in which is slidably fitted an upper telescopic member 51. The lower tubular member 50 of the pole 47 is connected by a tubular conduit 52 with one end of the T 43. Likewise, the lower tubular member 50 of the pole 48 is connected by a conduit 53, with the other end of T 43.

The members 50 of the poles 47 and 48 carry ears 54 and a toggle 55 has connected thereto a spring 56, the lower end of which is connected to the member 39.

Referring now more particularly to Figures 3 and 4, it will be noted that the upper ends of the intersections 51 of the station poles 47 and 48 carry a line 57 which forms the loop of the ground station. This loop, as well as the lead lines 58 which connect the loop with the occupant 10 of the life raft, are coiled within the upper end of the casing 11 as shown in Figure 3.

*Operation*

Figure 1:
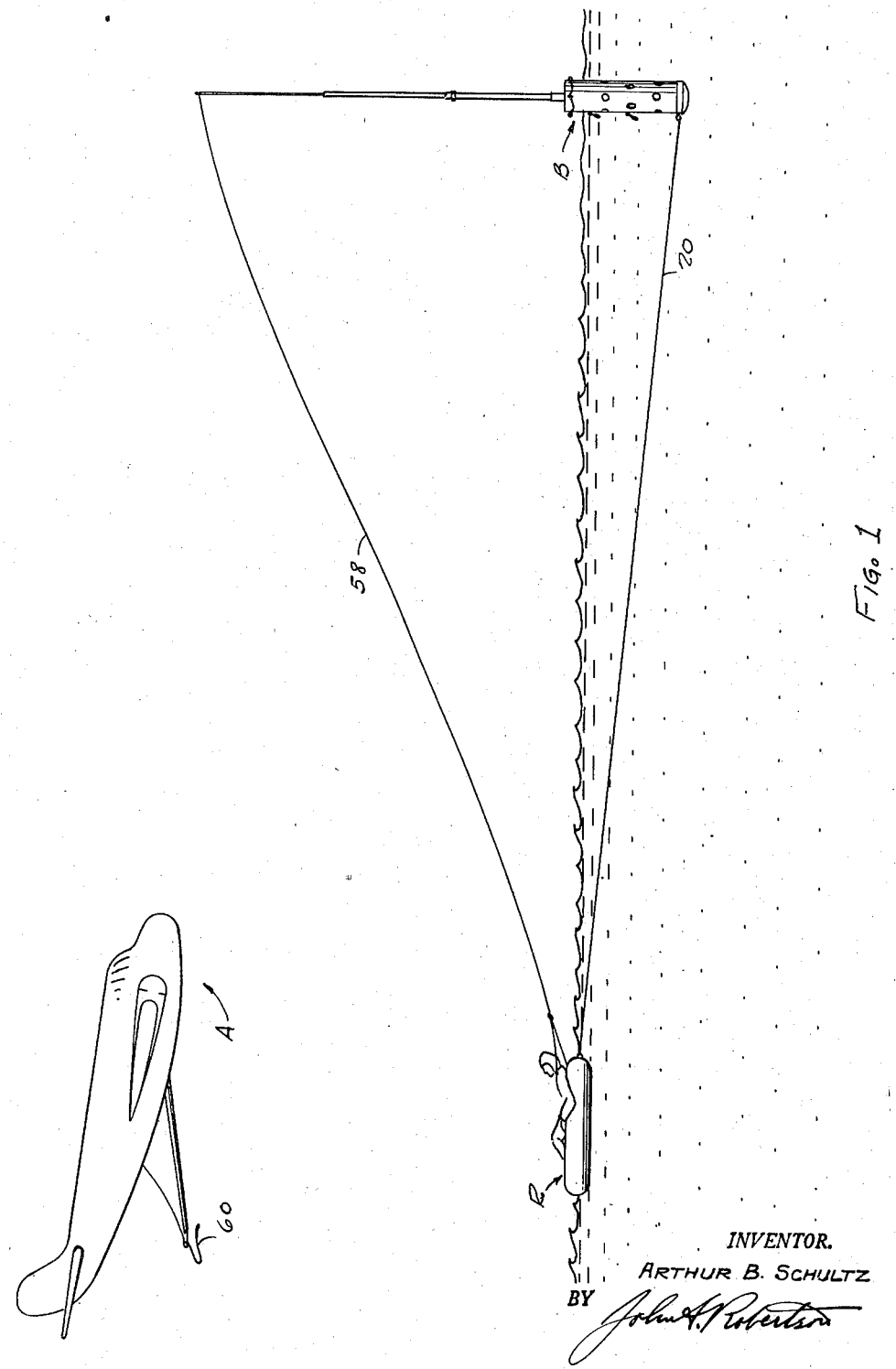
Figure 1 is a side view somewhat diagrammatic showing the relative positions of a pick-up aircraft, a life raft with a human being thereon, and the ground station.
Figure 2:
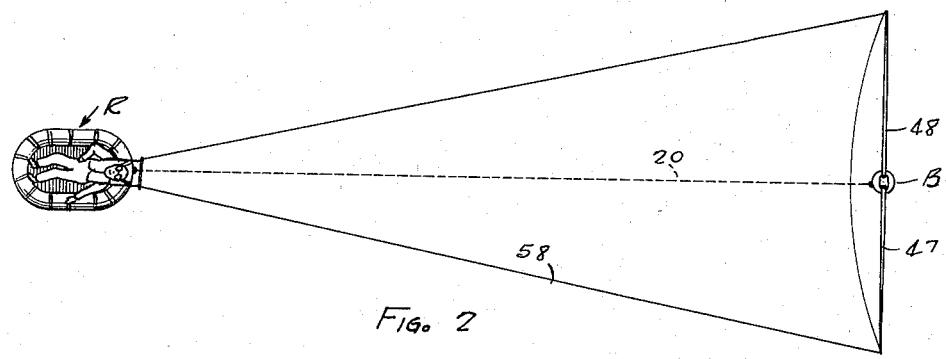
Figure 2 is a top plan view comparable to Figure 1 with the pick-up aircraft omitted.
Figure 7:
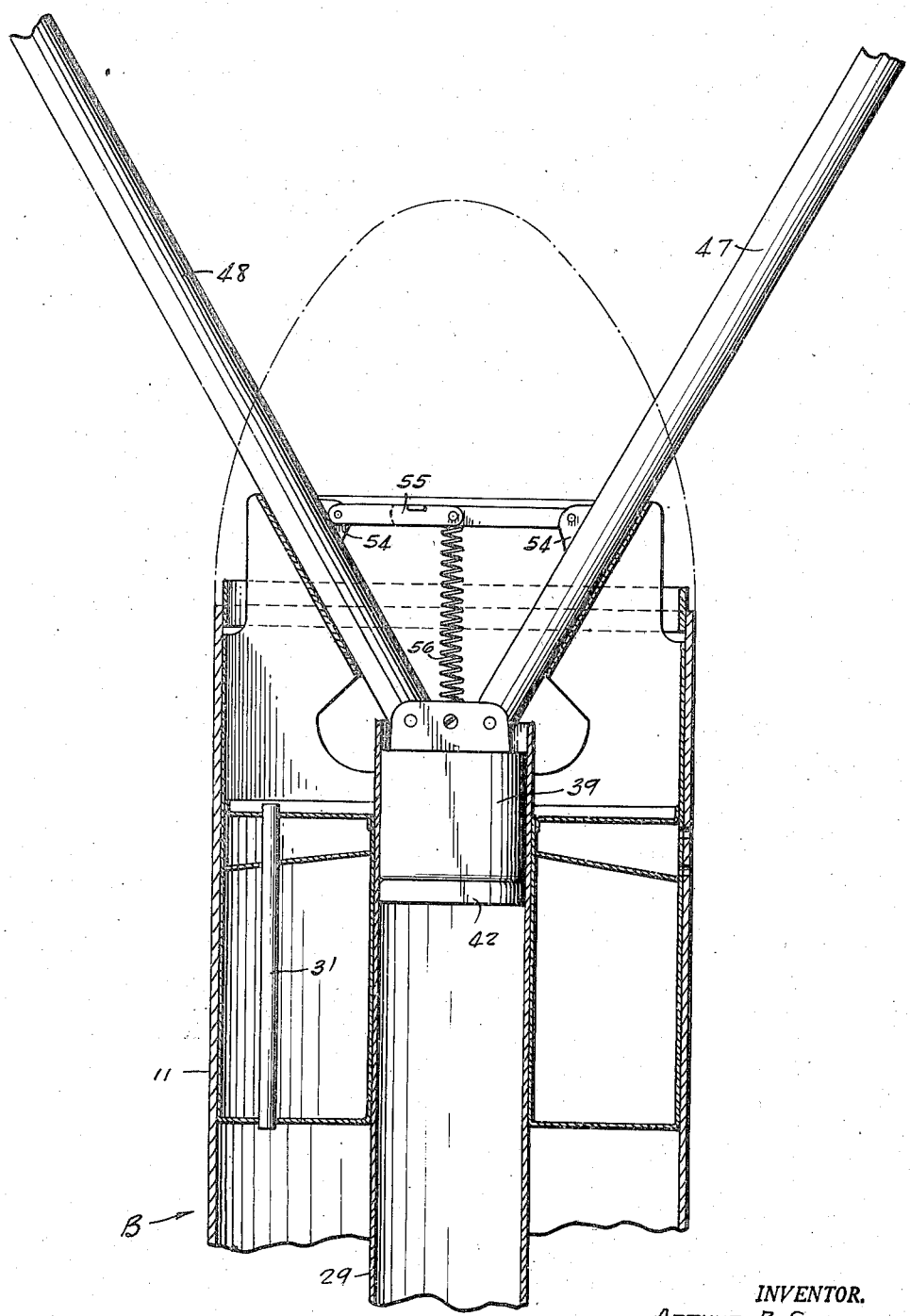
Figure 7 is a similar sectional view of the upper portion of the buoy.
Figure 8:
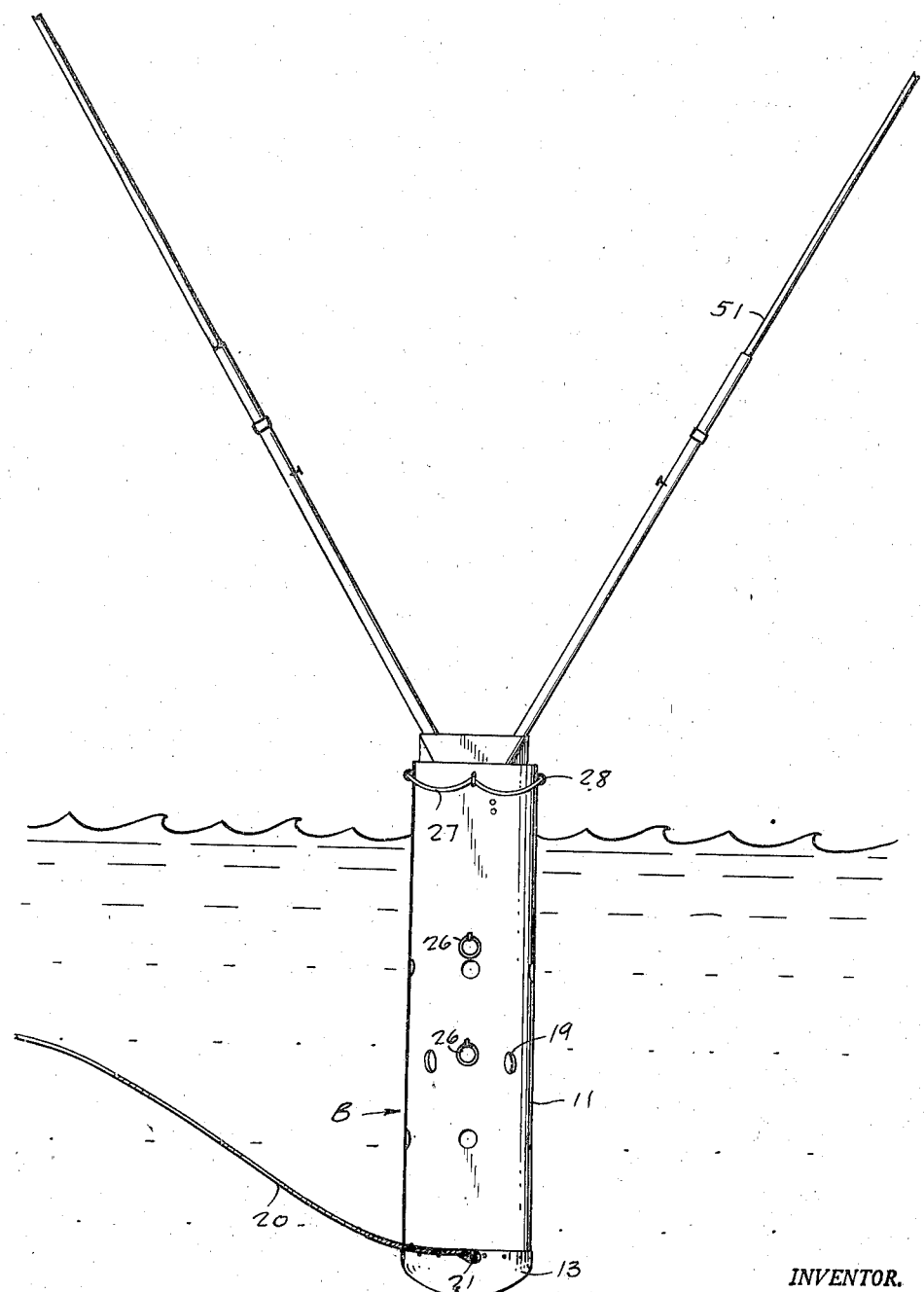
Figure 8 is an end elevational showing looking from the life raft of the buoy with the ground station poles erected, the upper portion of the station poles and loop being omitted.

While the manner of using the aforedescribed equipment is believed to be obvious, it will be noted that the pilot of the rescue aircraft which is shown at A in Figure 1 after locating the survivor who is to be rescued from the raft R, drops the buoy B in as close proximity as possible to the raft R. The survivor first avails of the ring 16 to pull the rip-cord and remove the closure 12. This exposes the ring 38. He then strips off the bands 24 and 25 to release the line 20. He then attaches the snap fastener 22 to the anchorage 23 on the life raft. The lines 58 are then connected to the harness which is worn by the occupant and which may be the same harness as his parachute harness or one comparable thereto. The ring 38 is now pulled to open the valve 36 and permit gas to flow from the reservoir 33 through the conduit 35 into the interior of the core 29. This gas first raises the assembly of cup-shaped members 39 and 42 into the position shown in Figure 7. The toggle 55 and spring 56 cooperate with the flared guide 32 to cause the station poles 47 and 48 to assume the diverging position illustrated in Figure 7. Gas also enters the lower tubular section 50 of the station poles and extends the upper telescopic sections 51. This causes the pick-up loop 57 to assume its erected position as indicated in Figure 2.

The pilot of the pick-up aircraft now flies in and makes the pick-up with the hook 60 of the rescue aircraft engaging the loop 57. The survivor 10 is thereby picked up from the life raft and hauled into the rescue aircraft.

While preferred specific embodiments of the invention are hereinbefore set forth, it is to be clearly understood that the invention is not to be limited to the exact constructions illustrated and described because various modifications of these details may be provided in putting the invention into practice within the purview of the appended claims.

What is claimed is:

1. In air pick-up, a unit adapted for use in conjunction with a life raft for rescue purposes and comprising a cylindrical buoy adapted to assume a substantially vertical position while floating in water, a removable cover for the upper end of said buoy, telescopic station poles within said buoy, and fluid pressure means for extending said station poles into an erected position.

2. In air pick-up, a unit adapted for use in conjunction with a life raft for rescue purposes and comprising a buoy including a weighted base, a cylindrical body portion and a removable end closure, a core within said buoy spaced within said body portion, extensible station poles within said core, means to extend said poles, and means to cause said poles to assume a diverging relation as they are extended.

3. In air pick-up, a unit adapted for use in conjunction with a life raft for rescue purposes and comprising a cylindrical buoy including a weighted base, a body portion, and removable cover, a core within said body portion extending upwardly from said base, a slide within said core, fluid pressure means for raising said slide, a pair of telescopic arms carried by said slide, and conduits connecting said telescopic arms to said fluid pressure means whereby the latter is rendered effective to cause said arms to extend.

4. In air pick-up, a unit adapted for use in conjunction with a life raft for rescue purposes and comprising a cylindrical buoy including a weighted base, a body portion, and removable cover, a core within said body portion extending upwardly from said base, a slide within said core, fluid pressure means for raising said slide, a pair of telescopic arms carried by said slide, and a guide at the upper end of said core for causing said arms to assume diverging relation as they are extended.

5. In air pick-up, a unit adapted for use in conjunction with a life raft for rescue purposes and comprising a buoy including a cylindrical body portion and a removable end closure, detachable means holding said end closure in sealing position, a line adapted to connect said buoy to a life raft, said line being folded into a compact condition on the exterior of said body portion, quickly detachable means holding said line in position, and an extensible ground station carried by said buoy and including a pick-up loop.

6. In a ground station for air pick-up from a body of water, a tube, a slide in said tube, means to admit fluid under-pressure beneath said slide to cause it to move upwardly in said tube, a pair of telescopic arms in spaced relation carried by said slide, each of said arms including a hollow lower section and an upper section, conduits establishing communication between said hollow lower sections and the underside of said slide whereby said fluid under-pressure is conducted to said hollow lower sections to cause extension of said telescopic poles, a toggle between said lower sections, a spring connecting the mid-point of said toggle to said slide, and a conical guide carried to the upper end of said tube and adapted to cooperate with said arms and toggle to cause said arms to assume a diverging relation in extended position.

ARTHUR B. SCHULTZ.

REFERENCES CITED

The following references are of record in the file of this patent:

UNITED STATES PATENTS

| Number | Name | Date |
|---|---|---|
| 1,070,197 | Snell | Aug. 12, 1913 |
| 1,735,385 | Fisher | Nov. 12, 1929 |
| 2,418,702 | du Pont | Apr. 8, 1947 |

FOREIGN PATENTS

| Number | Country | Date |
|---|---|---|
| 750,086 | France | Mar. 15, 1933 |